United States Patent
Colburn

(10) Patent No.: US 6,221,245 B1
(45) Date of Patent: Apr. 24, 2001

(54) NON-CHEMICAL SCALE PREVENTION AND CHLORINE REMOVAL WATER FILTER

(76) Inventor: Michael H. Colburn, 191 Paseo del Arquero, Vista, CA (US) 92084

( * ) Notice: Subject to any disclaimer, the term of this patent is extended or adjusted under 35 U.S.C. 154(b) by 0 days.

(21) Appl. No.: 09/458,835

(22) Filed: Dec. 13, 1999

(51) Int. Cl.$^7$ ..................................................... B01D 35/06
(52) U.S. Cl. ........................ 210/223; 210/137; 210/226; 210/440; 210/443
(58) Field of Search .................................... 210/223, 440, 210/441, 443, 444, 263, 266, 137, 222

(56) References Cited

U.S. PATENT DOCUMENTS

| | | |
|---|---|---|
| 4,422,933 | * 12/1983 | Sverre et al. |
| 4,495,074 | * 1/1985 | Hagiwara et al. |
| 4,501,661 | * 2/1985 | Karasawa . |
| 4,731,186 | * 3/1988 | Belasco . |
| 5,356,534 | * 10/1994 | Zimmerman et al. |

* cited by examiner

Primary Examiner—Joseph W. Drodge
Assistant Examiner—Terry K. Cecil
(74) Attorney, Agent, or Firm—Roy A. Ekstrand

(57) ABSTRACT

A water filtration system for preventing scale and removing chlorine includes a vertically oriented elongated pressure vessel 11 having a fitting at the upper end thereof. The fitting includes a passage 30 for directing water into the pressure vessel and a passage 40 for allowing water to flow outwardly from the pressure vessel. A catalytic/magnetic device 50 is coupled to the input fitting passage and includes a catalytic chamber 51 and a magnetic chamber 54 through which the input water flows. A flow diffuser 57 receives the output of the magnetic chamber and directs it through a chlorine filtering media 60 in an upwardly traveling water flow. The chlorine filtered water is allowed to pass outwardly from the pressure vessel. The catalytic chamber 51 includes flexible fibers 61 of high nickel stainless steel while the magnetic chamber includes a center tube 95 having a plurality of oppositely oriented magnets supported on the exterior thereof. The water traveling through the magnetic chamber is subjected to a plurality of reversing magnetic fields.

14 Claims, 3 Drawing Sheets

NON-CHEMICAL SCALE PREVENTION AND CHLORINE REMOVAL WATER FILTER

FIELD OF THE INVENTION

This invention relates generally to water filtration and processing systems and particularly to systems directed to avoiding or at least reducing problems associated with the formation of calcium scale.

BACKGROUND OF THE INVENTION

One of the most pervasive and vexing problems encountered in water processing systems and appliances is generally referred to as "calcium scale formation" or simply "calcium scaling". The problem of calcium scale is more pronounced in devices or systems which evaporate or heat water. Thus, devices such as plumbing systems, humidifiers, coffee pots, hot water heaters and so on are maximally plagued by calcium scaling problems. However, all water use or processing systems have some level of problems due to calcium scaling.

Calcium scale is, for the most part, caused by the depositing and/or accumulation of calcium carbonate (generally known as lime) or other calcium salts. Scale is formed as water evaporates from a suitable host surface such as the interior of a water system or processing device. The problem is exacerbated by heating of the water. Unfortunately, once formed, calcium scale does not significantly redissolve back into water and must be addressed by other methods than simply water flushing.

In addition to problems of the calcium scaling, dissolved calcium salts also tend to "harden" water. This all too common problem interferes with the function of soaps and detergents. In residential water systems, this problem is annoying and may diminish the effectiveness of laundering clothing and so on. In commercial systems, such as commercial laundries, hard water significantly impacts the operating costs and resulting profits of the laundering operation.

One of the most common methods of dealing with problems associated with calcium scaling and hard water caused by dissolved calcium salts employs so-called water softening. This process is chemical in nature and involves the addition of chemicals such as sodium chloride to the water process. While conventional chemically operative water softeners provide some water softening effect in the form of reduction of dissolved calcium salts, they require the addition of other chemical agents to the water. This additional chemical content in the water may itself be undesirable and adversely effect water quality. In addition, conventional water softeners generally require an electric or water powered control valve within the softener apparatus. This increases complexity and difficulty of operation as well as system costs.

There remain therefore a continuing need in the art for evermore improved systems and processes for addressing the problems of scaling and hard water associated with dissolved calcium salts. There remains a further need in the art for an improved system and process for minimizing the problems associated with dissolved calcium salts without resorting the addition of chemical agents to the water supply.

SUMMARY OF THE INVENTION

Accordingly, it is a general object of the present invention to provide an improved scale prevention and chlorine removal water filter. It is a more particular object of the present invention to provide an improved scale prevention and chlorine removal water filter which operates without the addition of chemical agents to the water supply.

In accordance with the present invention, there is provided a water filter system for processing water having dissolved solids of calcium ions and carbonate ions therein, the system comprising: an elongated pressure vessel having an upper neck and neck passage and an interior cavity; a fitting having a lower portion sealingly engaging the neck within the neck passage and defining an input passage for receiving a flow of water and an output passage for discharging a flow of water; a catalytic chamber coupled to the input passage supporting a quantity of catalytic media through which water flows, the catalytic media promoting the change of the calcium ions and carbonate ions to suspended sub-micron sized calcium carbonate; a magnetic chamber coupled to the catalytic chamber having a water passage therethrough and a plurality of magnets providing a plurality of reversing magnetic fields within the water passage traversed by water flowing through the water passage; and a quantity of chlorine filter media within the interior cavity of the pressure vessel, the water flowing downwardly through the input passage, the catalytic chamber, the magnetic chamber and upwardly through the chlorine filter media and the interior cavity and outwardly through the output passage.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
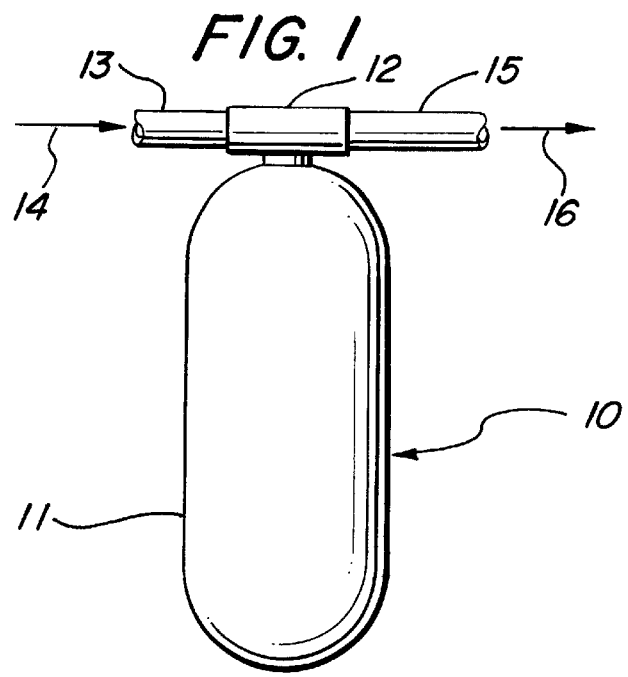
FIG. 1 sets forth a side elevation view of a water filter system in accordance with the present invention.

FIG. 1 sets forth a water filter constructed in accordance with the present invention and generally referenced by numeral 10. Water filter 10 includes an elongated vertically oriented pressure vessel 11 preferably formed of a high strength material such as high strength plastic, steel or stainless steel as required for a desired installation. Water filter 10 further includes a fitting 12 preferably formed in correspondence to the material of pressure vessel 11 such as plastic, brass, stainless steel or other high strength material. A water supply 13 is coupled to the input of fitting 12 while an output pipe 15 is coupled to the output portion of fitting 12. The structure of fitting 12 is set forth below in FIG. 2 in greater detail. However, suffice it to note here that fitting 12 directs the input water flow of water supply 13 which flows into fitting 12 in the direction indicated by arrow 14 downwardly into the interior of water filter 10. As is further shown in FIG. 2, fitting 12 also directs the output of water filter 10 outwardly through output pipe 15 via fitting 12 in the direction indicated by arrow 16. Thus, water supply 13 provides a flow to fitting 12 which is directed to the interior of water filter 10 and is processed within pressure vessel 11. The processed water exits through a separate passage in fitting 12 (seen in FIG. 2) and is carried away from fitting 12 by output pipe 15 in the direction indicated by arrow 16.

The operation and structure of water filter 10 is set forth below in greater detail. However, by way of overview, the present invention water filter system operates to prevent the formation of calcium scale caused by naturally occurring salts of calcium which normally exist in most water sources. The present invention filter contains special filtration media which also remove chlorine present in most municipal water supplies or the like. The chlorine removal is accomplished in the manner set forth below in greater detail without the use of chemicals such as sodium chloride normally utilized as softening agents in conventional water softeners.

The basic operation of the present invention water filter system is operative to change the state of calcium hardness in water from a dissolved solid consisting of calcium ions and carbonate ions to a sub-micron size suspended solid of calcium carbonate. As a suspended solid, the calcium carbonate will not deposit on metal surfaces and will not cause a film or other degradation of the operation of soaps dissolved in the water. It has been determined that the suspended sub-micron sized particles of hardness will redissolve into the water within twenty-four to seventy-two hours depending upon the pH of the water and its temperature. As a result, the present invention system is most suitably utilized in continuous processing at a point of use rather than for processing water which will remain contained and unused for extending periods of time.

The operation of the present invention water filter system is described below and includes reducing the operation pressure of the flowing water by a sufficient amount to drive off carbon dioxide dissolved in the water in order to lower the solubility of the calcium within the water. The water at reduced pressure is then passed through a chamber containing flexible fibers of nickel stainless steel which acts as a catalyst causing additional sub-micron particles to form. The water then enters a specially constructed chamber in which it is passed through a plurality of reversing magnetic fields causing a breakdown of the zeta potential (the naturally occurring chemical charge which keeps similarly charged particles apart) and causes a resulting agglomeration of the particles within the water.

Figure 2:
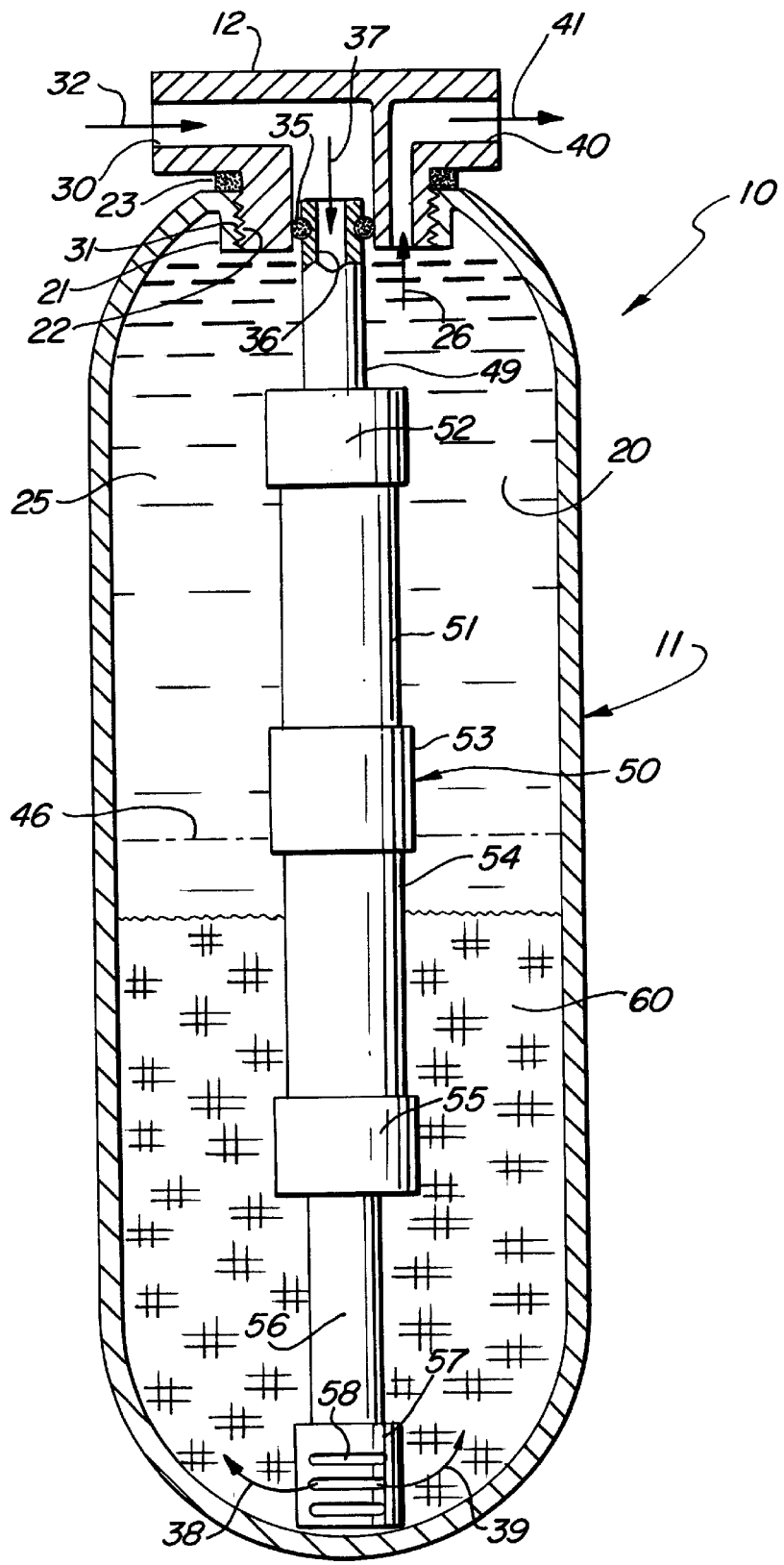
FIG. 2 sets forth a section view of the present invention water filter system.

FIG. 2 sets forth a section view of water filter system 10. Water filter 10 includes an elongated vertically oriented pressure vessel 11 preferably formed of a high strength material such as plastic, steel, stainless steel or the like. Pressure vessel 11 defines an interior 20 forming a closed end pressure resistant chamber having a generally cylindrical neck 21 formed at the upper end thereof. Neck 21 defines a threaded neck passage 22. A fitting 12 having a generally T-shaped body includes a threaded portion 31 received within threaded neck passage 22 in a sealing engagement. An annular resilient seal 23 is captivated upon threaded portion 31 upon fitting 12 and further seals pressure vessel 11. Fitting 12 defines an input passage 30 extending downwardly in communication with interior cavity 20 of pressure vessel 11. Fitting 12 further includes an upwardly extending output passage 40 also communicating with interior 20 of pressure vessel 11.

In accordance with the present invention, a catalytic/magnetic processing device 50 is supported within interior cavity 20 of pressure vessel 11. Catalytic/magnetic device 50 includes an elongated cylindrical input tube 49 having a passage 36 formed therein. The upper end of input tube 49 is received within the lower portion of input passage 30 of fitting 12. A resilient annular seal 35 such as a conventional O-ring is captivated upon input tube 49 by a suitable groove formed therein. Seal 35 prevents communication between input passage 30 and interior cavity 20 outside of passage 31. Thus, all water flow into input passage 30 is carried into interior cavity 20 by passage 36 of input tube 49. This water flow moves downwardly in the directions indicated by arrows 32 and 37 through input tube 49 into catalytic/magnetic device 50.

The structure of catalytic/magnetic device 50 is set forth below in FIG. 3 in greater detail. However, suffice it to note here that device 50 includes a catalytic chamber 51 formed of a non-magnetic material such as polyvinyl chloride (PVC) or the like. A connector 52 also formed of PVC material joins input pipe 49 to catalytic chamber 51. Catalytic/magnetic device 50 further includes a magnetic chamber 54 also formed of a non-magnetic material such as PVC or the like joined to catalytic chamber 51 by a connector 53. A connector 55 joins magnetic chamber 54 to a downwardly extending diffuser tube 56. Connectors 53 and 55 are preferably formed of a non-magnetic material such as PVC or the like. A flow diffuser 57 is secured to the bottom end of diffuser tube 56 and defines a plurality of elongated diffuser apertures 58 therein.

A quantity of fibrous filler material 60 is positioned about the lower end of catalytic/magnetic device 50 and diffuser 57 and extends upwardly to a level 45 in the absence of water flow. The preferred material utilized for filter material 60 comprises a blend of copper and zinc materials manufactured and sold by KDF Fluid Treatment, Inc. located in Three Rivers, Mich.

In operation, water under pressure is directed to fitting 12 by a suitable input supply pipe such as water supply pipe 13 shown in FIG. 1. The source pressure of the water supply causes water to flow into fitting 12 in the direction indicated by arrow 32 and downwardly through passage 36 of input tube 49 in the direction indicated by arrow 37. The water flow path of catalytic/magnetic device 50 is shown in FIG. 3 in greater detail. Suffice it to note at this point that catalytic/magnetic device 50 is a linear flow device in the sense that water flows downwardly through input tube 49 and thereafter flows downwardly through catalytic chamber 51 and magnetic chamber 54 to enter diffuser tube 56. The water flow continues through diffuser tube 56 which is hollow and similar to input tube 49 defining a passage therethrough. The output flow from the bottom end of diffuser tube 56 flows outwardly through diffuser apertures 58 of diffuser 57 as indicated by arrows 38 and 39. The function of diffuser 57 is to provide an evenly distributed widely dispersed water flow outwardly at the bottom of pressure vessel 11. The water pressure within catalytic/magnetic device causes a continued flow of water outwardly from diffuser 57 and upwardly through filter material 60. Filter material 60 is sensitive to the extent of water flow in that its coarseness or filter density is decreased as water flow increases. Accordingly, it has been found advantageous to limit the water flow rate and diameter of pressure vessel 11 to a relationship which maintains an expansion of filter material 60 during water flow less than fifteen percent of its non-flow volume. For purposes of illustration, this maximum flow expansion of filter material 60 is illustrated by expansion level 46 shown in dashed-line representation. The continuation of water flow moves the filtered water upwardly above filter material 60 and fills the remainder of interior 20 as indicated by quantity of water 25. The water in the upper portion of interior cavity 20 is forced outwardly through output passage 40 of fitting 12 in the direction indicated by arrows 26 and 41. This output water has been filtered in accordance with the present invention and is preferably used in a continuous water use process.

In the manner set forth below in greater detail in FIG. 3, catalytic chamber 51 utilizes a high nickel stainless steel catalytic media formed of flexible fibers which cause the above-mentioned sub-micron particles to form. Magnetic chamber 54 subjects the water flowing therethrough to a plurality of reversing magnetic fields created by internal magnets within chamber 54. The reversing magnetic fields within chamber 54 together with the velocity of water flow through the chamber causes a breakdown of the naturally occurring chemical charge (zeta potential) which normally keeps similarly charged particles apart. As a result, the agglomeration of particles occurs.

The diffused upward flow of water exiting diffuser 57 passes through filter material 60 resulting in the removal of chlorine from the water flow. The upward flow of water through filter material 60 provides a filter bed which expands in response to flow allowing particles to move through the chlorine filter material without clogging the material. It must be understood that the function of filter material 60 is the removal of chlorine and that the present invention filter system does not rely upon filter material 60 for removal of particulate matter from the water. For the most part, water supplied by municipal water systems or residential well systems has generally been filtered for removal of particulate material prior to the supply to the user. Over time, however, filter materials subjected to a downward flow of water in the manner utilized by most prior art filtering systems tend to accumulate sufficient particulate material to clog. This clogging tendency of prior art devices results in the need for periodic reverse flushing which is achieved by a relatively complex and expensive reverse flushing valve mechanism.

The present invention system utilizing an upward flow through filter material 60 avoids this need for reverse flushing by utilizing upward flow through a filter material and its corresponding expansion with flow to allow the minor amount of particulate matter within the supplied water to be carried through the chlorine filtering material. As a result, the need for an expensive and complex reverse flushing valve is avoided.

Figure 3:
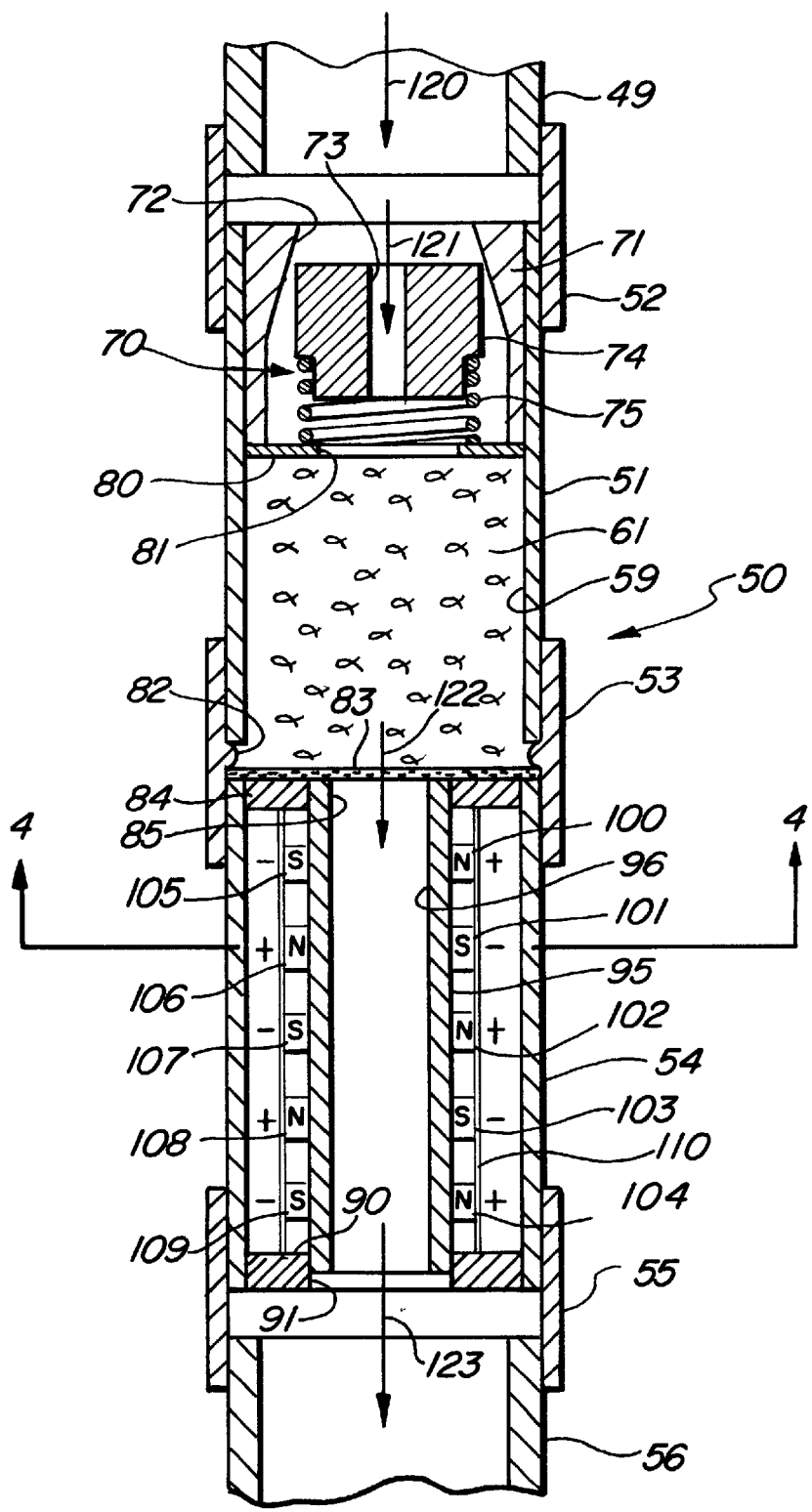
FIG. 3 sets forth a partial section view of the catalytic and magnetic chambers of the present invention water filter system.

FIG. 3 sets forth a section view of catalytic/magnetic device 50. As described above, device 50 is coupled to an input tube 49 by a connector 52 and is coupled to a downwardly extending diffuser tube 56 by a connector 55. Both connectors 52 and 55 are preferably formed of a non-magnetic material such as PVC or the like. Basically, catalytic/magnetic device 50 includes a catalytic chamber 51 having a pressure regulator 70 reducing the pressure of water flowing into the upper portion of the catalytic chamber together with a magnetic chamber through which the output of catalytic chamber 51 flows to diffuser tube 56.

More specifically, catalytic chamber 51 is preferably formed of a non-magnetic material such as PVC or the like and defines an interior 59. A quantity of flexible catalytic media 61 is supported within interior 59 of catalytic chamber 51. In the preferred fabrication of the present invention, flexible catalytic media 61 comprises a catalytic material formed of high nickel content stainless steel formed in flexible fibers. The flexibility of catalytic material fibers prevents the build-up of scale on the fiber surfaces and thus avoids the need for a cleaning operation. A retainer 80 having an aperture 81 together with a retainer screen 83 confine the flexible catalytic media to the desired portion of catalytic chamber 51. Retainer screen 83 is preferably formed of a stainless steel material.

Catalytic chamber 51 further includes a pressure regulator 70 formed of a regulator housing 71 defining a tapered port 72 therein. Pressure regulator 70 further includes a regulator plug 72 movably supported within tapered port 72 by a pressure regulator spring 75. Regulator plug 74 defines a tapered passage 73 therein.

Catalytic/magnetic device 50 includes a magnetic chamber 54 preferably formed of a non-magnetic material such as PVC or the like. A pair of annular retainers 84 and 90 defining respective apertures 85 and 91 are supported within the interior of magnetic chamber 54. A magnetic chamber flow tube 95 formed of a non-magnetic or magnetically transparent material such as PVC is supported within magnetic chamber 54 by retainers 84 and 90. In accordance with an important aspect of the present invention, flow tube 95 defines a center passage 96 having a diameter selected to provide a desired water flow speed therethrough. In further accordance with an important aspect of the present invention, a plurality of permanent magnets 100 through 104 are supported upon the exterior of flow tube 95 in an alternating polarity arrangement. In further accordance with the present invention, a second polarity of permanent magnets 105 through 109 are supported on the opposite side of flow tube 95 in an alternating polarity arrangement. In addition to the alternating polarities of magnets 100 through 104 and magnets 105 through 109, the polarities of opposed pairs formed therebetween are also oppositely oriented in polarity. Thus, magnet 100 is oppositely oriented in polarity with respect to magnet 105. Similarly, magnetic 101 is oppositely oriented with respect to magnet 106 while magnets 102, 103 and 104 are oppositely oriented with respect to magnets 107, 108 and 109 respectively. Magnets 100 through 109 are retained upon flow tube 95 by a wrap 110. In its preferred form, wrap 110 comprises a self-adhering tape and liquid vinyl wrap which secures magnets 100 through 109 in a fixed relationship upon flow tube 95. In the preferred fabrication of the present invention, magnets 100 through 109 comprise neodymium magnets. However, it will be recognized that other types of magnets suitably arranged may be utilized without departing from the spirit and scope of the present invention.

In operation, water flows downwardly from input tube 49 in the direction indicated by arrow 120 into pressure regulator 70. The function of pressure regulator 70 is to provide a reduced water pressure flow suitable for operation within catalytic chamber 51 and magnetic chamber 54. Pressure regulator 70 utilizes the tapered structure of passage 73 to create a pressure drop at low water flow rates. In addition, the spacing between the outside of regulator plug 74 and tapered port 72 is controlled by regulated spring 75 such that changes in water flow are accommodated while retaining reduced pressure. The water at reduced pressure contains a reduced amount of carbon dioxide which in turns lowers the solubility level of calcium in the water. The water from pressure regulator 70 then passes through flexible catalytic media 61. The high nickel stainless steel catalytic media within catalytic chamber 51 acts as a catalyst to cause additional sub-micron particles of solid calcium carbonate to form. The flexibility of the high nickel stainless steel fibers utilized in catalytic media 61 prevents build up of calcium scale on the catalytic material. This in turn avoids the need for periodic cleaning. The output flow from flexible catalytic media 61 passes through retainer screen 83 in the direction indicated by arrow 122 into passage 96 of flow tube 95. As the water flows downwardly through passage 96, it passes through ten reversing magnetic fields created by magnets 100 through 109. The alignment of magnetic fields together with the velocity of water flow through passage 96 causes a breakdown of the zeta potential for the suspended solids within the flowing water. The zeta potential is the naturally occurring chemical charge which causes similarly charged particles to repel each other. With the breakdown of the zeta potential, the suspended solids agglomerate. The water flow then continues downwardly in the direction indicated by arrow 123 into diffuser tube 56 and is passed through filter material 60 (seen in FIG. 2) for the final step of chlorine removal.

Figure 4:
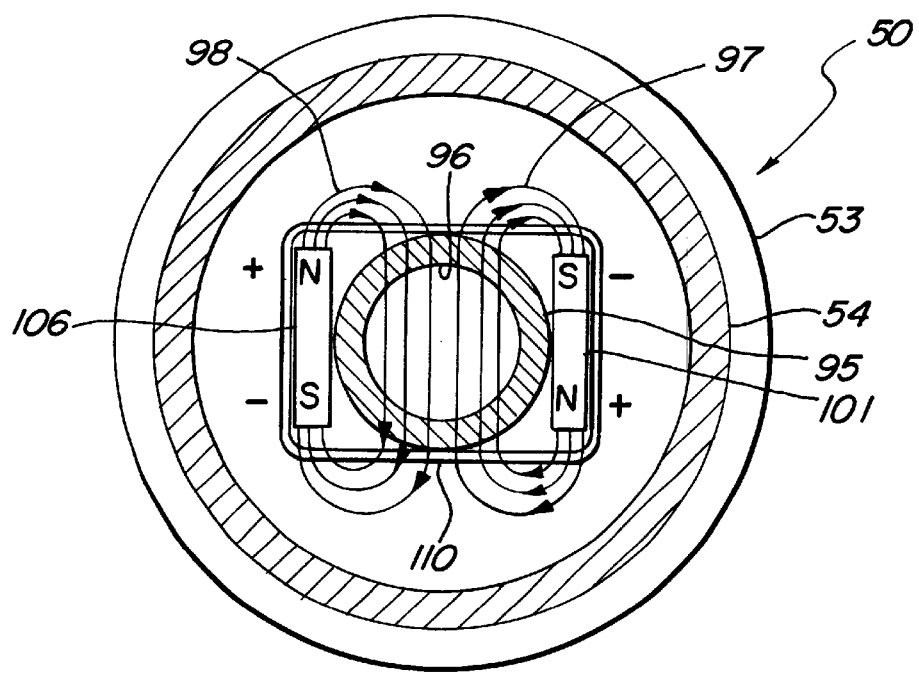
FIG. 4 sets forth a section view of the magnetic chamber of the present invention taken along section lines 4—4 in FIG. 3.

FIG. 4 sets forth a section view of catalytic/magnetic device 50 taken along section lines 4—4 in FIG. 3. As described above, device 50 includes a magnetic chamber 54 joined by a connector 53 to catalytic chamber 51 (seen in FIG. 3). Magnetic chamber 54 further supports a cylindrical flow tube 95 defining a passage 56 therethrough. In the operation of device 50, water flows downwardly through passage 56 of flow tube 95. A plurality of magnets 100 through 109 (seen in FIG. 3) are supported upon the exterior of flow tube 95. As illustrated in FIG. 4, magnets 101 and 106 are supported on opposite sides of flow tube 95. Magnets 101 and 106 are secured to flow tube 95 by a wrap 110. In accordance with an important aspect of the present invention, each magnet is oppositely oriented with respect to the opposing magnet on the opposite side therefrom on flow tube 95. Thus, magnet 101 and magnet 106 are supported upon flow tube 95 in an opposite orientation as shown. As a result, the magnetic flux indicated by curved lines 97 flowing about magnet 101 are oppositely directed with respect to the magnetic flux indicated by curved lines 98 of magnet 106 as they pass through passage 96 of flow tube 95. Returning temporarily to FIG. 3, it will be recalled that each adjacent magnet on passage 96 is also oppositely oriented in its polarity. Thus, water flowing through passage 96 of flow tube 95 is subjected to the reversing magnetic fields of magnets 100 through 109 (seen in FIG. 3) to provide the resulting breakdown of zeta potential and resulting agglomeration of particles within the water.

What has been shown is a water filtration system which changes the state of calcium hardness in water from a dissolved solid consisting of calcium ions and carbonate ions to a sub-micron sized suspended solid of calcium carbonate. The system further removes the chlorine from the processed water without the use of chemical agents. The system shown is self-cleaning and avoids the need for periodic cleaning and for reverse flushing to remove accumulated particulate material.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A water filter system for processing water having dissolved solids of calcium ions and carbonate ions therein, said system comprising:
    an elongated pressure vessel having an upper neck and neck passage and an interior cavity;
    a fitting having a lower portion sealingly engaging said neck within said neck passage and defining an input passage for receiving a flow of water and an output passage for discharging a flow of water;
    a catalytic chamber coupled to said input passage supporting a quantity of catalytic media through which water flows, said catalytic media promoting the change of said calcium ions and carbonate ions to suspended sub-micron sized calcium carbonate;
    a magnetic chamber coupled to said catalytic chamber having a water passage therethrough and a plurality of magnets providing a plurality of reversing magnetic fields within said water passage traversed by water flowing through said water passage; and
    a quantity of chlorine filtering media within said interior cavity of said pressure vessel,
    said water flowing downwardly through said input passage, said catalytic chamber, said magnetic chamber and upwardly through said chlorine filtering media and said interior cavity and outwardly through said output passage.

2. The water filter system set forth in claim 1 wherein said catalytic chamber includes a pressure regulator, interposed between said input passage and said quantity of catalytic media, for reducing the water pressure of water entering said quantity of catalytic media to reduce carbon dioxide within said water.

3. The water filter system set forth in claim 2 wherein said magnetic chamber includes a downwardly extending diffuser tube and a diffuser for discharging water flow from said magnetic chamber into said chlorine filtering media in a diffused upward water flow through said chlorine filtering media.

4. The water filter system set forth in claim 3 wherein said plurality of magnets include:
    a first group of elongated magnets each having a north pole and a south pole supported about said water passage in a first alternating pole arrangement; and
    a second group of elongated magnets each having a north pole and a south pole supported about said water passage in a second alternating pole arrangement.

5. The water filter system set forth in claim 4 wherein said water passage is formed within a magnetically transparent chamber and wherein said first and second groups of elongated magnets are supported on opposed sides of said magnetically transparent chamber.

6. The water filter system set forth in claim 5 wherein each of said magnets in said first group of elongated magnets is aligned with one of said elongated magnets oppositely positioned across said water passage and has its north pole aligned with the south pole thereof.

7. The water filter system set forth in claim 6 wherein said chlorine filtering media is formed of a blend of copper and zinc.

8. The water filter system set forth in claim 6 wherein said catalytic media includes flexible elements formed of stainless steel having a high nickel content.

9. The water filter system set forth in claim 1 wherein said plurality of magnets include:
    a first group of elongated magnets each having a north pole and a south pole supported about said water passage in a first alternating pole arrangement; and
    a second group of elongated magnets each having a north pole and a south pole supported about said water passage in a second alternating pole arrangement.

10. The water filter system set forth in claim 9 wherein said water passage is formed within a magnetically transparent chamber and wherein said first and second groups of elongated magnets are supported on opposed sides of said magnetically transparent chamber.

11. The water filter system set forth in claim 10 wherein said each of said magnets in said first group of elongated magnets is aligned with one of said elongated magnets oppositely positioned across said water passage and has its north pole aligned with the south pole thereof.

12. The water filter system set forth in claim 1 wherein said catalytic media includes flexible elements formed of stainless steel having a high nickel content.

13. The water filter system set forth in claim 12 wherein said chlorine filtering media is formed of a blend of copper and zinc.

14. A water filter system for processing water having dissolved calcium salts therein, said water filter system comprising:

a pressure vessel having an interior cavity and a neck passage;

a fitting coupled to said neck passage having an input water passage and an output water passage;

a catalytic chamber having means for promoting conversion of said calcium salts to sub-micron size particles of suspended calcium carbonate;

a magnetic chamber having a magnetic field water passage for water flow and a plurality of magnets arranged to provide a plurality of reversing magnetic fields for water flowing through said magnetic water passage; and means for causing said water to flow through said catalytic chamber and said magnetic chamber after it flows into said input water passage and before it flows out of said output water passage.

* * * * *